United States Patent [19]
Brookey

[11] Patent Number: 5,881,826
[45] Date of Patent: Mar. 16, 1999

[54] APHRON-CONTAINING WELL DRILLING AND SERVICING FLUIDS

[75] Inventor: Tommy F. Brookey, Edmond, Okla.

[73] Assignee: ActiSystems, Inc., Edmond, Okla.

[21] Appl. No.: 800,727

[22] Filed: Feb. 13, 1997

[51] Int. Cl.$^6$ ........................................................ C09K 7/02
[52] U.S. Cl. .............................. 175/72; 507/102; 507/202
[58] Field of Search ................................ 166/292; 175/72; 507/102, 202, 110

[56] References Cited

U.S. PATENT DOCUMENTS

| | | | |
|---|---|---|---|
| 5,513,712 | 5/1996 | Sydansk | 507/102 X |
| 5,682,951 | 11/1997 | Sydansk | 166/292 |
| 5,716,910 | 2/1998 | Totten et al. | 507/102 |
| 5,728,652 | 3/1998 | Dobson, Jr. et al. | 507/110 X |

OTHER PUBLICATIONS

Felix Sebba, "Foams and Biliquid Foams–Aphrons", Virginia Polytechnic Institute and State University, pp. 62–69, 1987.

Gas Research Institute, "Underbalanced Drilling Manual", pp. 6–8, 75–81, 96, 101–104, 119–120, 125–127, 131, 135–139, 1997.

*Primary Examiner*—David J. Bagnell
*Attorney, Agent, or Firm*—Roy F. House

[57] ABSTRACT

The invention provides a method and fluid for drilling or servicing a well in a subterranean formation containing lost circulation zones or depleted, low pressure reservoirs. A method of decreasing the density of the fluid circulated in a borehole, decreasing the invasion of fluid into formations contacted by the fluid, or decreasing the lost circulation potential of the fluid is provided by using as the fluid an aqueous liquid having dispersed therein a polymer which increases the low shear rate viscosity of the fluid to the extent that the thixotropic index of the fluid is at least about 10 and a surfactant, and wherein the fluid contains aphrons preferably generated by the turbulence and pressure drop as the fluid exits the drill bit in the vicinity of the formation.

15 Claims, No Drawings

5,881,826

APHRON-CONTAINING WELL DRILLING AND SERVICING FLUIDS

BACKGROUND OF THE INVENTION

Formation damage due to invasion by drilling fluids is a well known problem. Many zones contain formation clays which hydrate when in contact with water such as the filtrate from drilling fluids. These hydrated clays tend to block the producing zones, primarily sands so that oil and gas cannot move to the borehole and be produced.

These zones are also damaged by solids which are carried into the openings with the fluid. The movement of drilling fluids and filtrate through these openings also causes the dislodging and migration of solids in place in the formation. These solids can lodge and block movement of produced hydrocarbons.

Invasion is caused by the differential pressure of the hydrostatic column which is generally greater than the formation pressure, especially in low pressure or depleted zones. Invasion is also due to the openings in the rock and the ability of fluids to move through the rock, the porosity and permeability of the zone.

Because of this differential pressure, drillers have long used filtrate control mechanisms to control the movement of drilling fluids and filtrate in to and through the formation openings. This mechanism involves adding particles to the drilling fluid which are then deposited onto the borehole wall while circulating and drilling. These particles are generally some combination of bentonite, starch, lignins, polymers, barite, and drilled solids. They are used to plug and seal the borehole due to the particle size and shape, and some control is also due to the viscosity of the filtrate when water soluble polymers are used. Although this wallcake forms a semipermeable barrier, some filtrate moves through and into the zone both before and after the wallcake is formed.

Wallcake control, then is not complete and some filtrate water is allowed to contact the producing zone. Another disadvantage of wallcake mud is that when filtrate moves through, the solids are screened out and left in the cake. This causes the cake to become thicker and can lead to differential sticking of the drill string.

More recent technology has seen the development of Low Shear Rate Viscosity (LSRV) fluids. LSRV is created by the addition of specialized polymers to water or brines to form a drilling fluid. These polymers have a unique ability to create extremely high viscosity at very low shear rates. These LSRV fluids have been widely used because of their carrying capacity and solids suspension ability. They have been accepted as a way to minimize cuttings bed formation in high angle and horizontal wells, and as a way to reduce barite sag in high weight muds.

Recent studies and field experience indicate that this LSRV is helpful in controlling the invasion of drilling fluids and filtrate by creating a high resistance to movement into the formation openings. Since the fluid moves at a very slow rate, viscosity becomes very high, and the drilling fluid is contained within the borehole with a very slight penetration. This has been beneficial in protecting the zones from damage as well as reducing differential sticking in these fluids. See for example the article entitled "Drill-In Fluids Improve High Angle Well Production", Supplement to the Petroleum Engineer International, March, 1995.

Lost circulation is also a severe problem in rotary drilling. Lost circulation occurs when the differential pressure of the hydrostatic column is much greater than formation pressure. The openings in the rock are able to accept and store drilling fluid so that none is returned to surface for recirculation. The fluid is lost downhole and can become an expensive and dangerous problem. Lost circulation can lead to hole instability, stuck drill pipe, and loss of well control. At the least, it halts drilling operations and requires expensive replacement volume to be used.

In addition to the fluid volume being lost, expensive lost circulation materials (LCM) are required. These are usually fibrous, granular, or flake materials such as can fibers, wood fibers, cottonseed hulls, nut hulls, mica, cellophane, and many other materials. These LCM materials are added to the fluid system so that they may be carried into the loss zone and lodge to form a bridge on which other materials may begin to build and seal. These LCM materials themselves are damaging to the zones, and because they must be carried many times in the drilling fluid to maintain circulation, solids removal is halted and high solids mud results.

Methods of correcting lost circulation of drilling fluids by aerating the drilling fluids are set forth in U.S. Pat. No. 2,818,230 (Davis) and U.S. Pat. No. 4,155,410 (Jackson).

The use of underbalanced drilling has increased as the development of low pressure formations has acquired more importance. Horizontal drilling, in particular, has increased the need to drill across zones that are not only low pressure, but highly fractured or permeable. The exposure of numerous fractures or openings having low formation pressures has increased the problem of lost circulation and formation invasion. The necessity of down hole tools many times preclude the use of bridging materials to stop these losses. This has led to the use of underbalanced drilling techniques to control the losses and invasion of these zones. Some of these techniques include the use of air, mist, and foam drilling fluids. Problems with these fluids include hole cleaning, control of formation fluids, corrosion, and requirements for expensive, often hard to get equipment such as compressors and boosters. Such fluids are not re-circulateable and must be constantly generated as the drilling proceeds.

SUMMARY OF THE INVENTION

A new fluid technique combines the use of low shear rate viscosity generating polymers with surfactants to form colloidal gas aphrons in a re-circulateable well drilling and servicing fluid. The aphrons use encapsulated air available in most circulating fluids. The aphrons reduce the density of the fluid and provide a means of bridging and sealing of the formations contacted by the fluid as the bubbles expand to fill the openings exposed while drilling. The low shear rate polymers strengthen the microbubble and also provide a resistance to movement within the formation so that losses of fluid are substantially reduced as the formation is being drilled. In this way, lost circulation is prevented. Any fluid which enters the formation is clean and essentially solids-free such that damage of the formation is significantly less than with solids-containing fluids. Since no solids or particles are involved in this method, solids removal equipment can be used to keep the fluid as clean as possible.

It is an object of this invention to provide recirculateable well drilling and servicing fluids which have an enhanced low shear rate viscosity (hereinafter abbreviated to "ELSRV") containing aphrons.

It is another object of this invention to provide a method of bridging and sealing subterranean formations at the surface of a borehole during well drilling and servicing operations.

These and other objects of the invention will be obvious to one skilled in the art upon reading this specification and claims.

The process can comprise, consist essentially of, or consist of the stated steps with the stated materials. The compositions can comprise, consist essentially of, or consist of the stated materials.

DESCRIPTION OF THE PREFERRED EMBODIMENTS OF THE INVENTION

The well drilling and servicing fluids of this invention comprise an aqueous liquid having a water soluble polymer hydrated therein and a surfactant. The polymers useful in the ELSRV fluids of this invention are such that the ELSRV fluids have a "thixotropic index" of at least 10, wherein the thixotropic index is the ratio of the Brookfield viscosity at 0.5 rpm to the Brookfield viscosity at 100 rpm. The thixotropic index is indicative of the shear thinning characteristics of the fluid.

The base aqueous fluid in which the low shear rate modifying polymer is hydrated may be any aqueous liquid which is compatible with the polymer. Thus the base liquid may be fresh water, or a brine containing soluble salts such as sodium chloride, potassium chloride, calcium chloride, sodium bromide, potassium bromide, calcium bromide, zinc bromide, sodium formate, potassium formate, cesium formate, and the like. The brine may contain one or more soluble salts at any desired concentration up to saturation.

The polymers useful in the ELSRV fluids of this invention comprise any water soluble polymer which increases the low shear rate viscosity of the fluid to produce a fluid exhibiting a high yield stress, shear thinning behavior. Particularly useful are biopolymers produced by the action of bacteria, fungi, or other microorganisms on a suitable substrate. Exemplary biopolymers are the polysaccharides produced by the action of Xanthomonas compestris bacteria which are known as xanthan gums. These are available commercially from several sources including: Kelco Oil Field Group, Inc., under the trademarks "Xanvis" and "Kelzan"; Rhone-Poulenc Chimie Fine, under the trademark "Rhodopol 23-p"; Pfizer Inc., under the trademark "Flocon 4800C"; Shell International Chemical Company of London, U.K., under the trademark "Shellflo ZA"; and Drilling Specialties Company, under the trademark "Flowzan." See for example U.S. Pat. No. 4,299,825 and U.S. Pat. No. 4,758,356, each incorporated herein by reference. Other biopolymers useful in the fluids of this invention are the so-called welan gums produced by fermentation with a microorganism of the genus Alcaligenes. See for example U.S. Pat. No. 4,342,866, incorporated herein by reference. Gellan gums are disclosed in U.S. Pat. No. 4,503,084, incorporated herein by reference. Scleroglucan polysaccharides produced by fungi of the genus sclerotium are disclosed in U.S. Pat. No. 3,301,848, incorporated herein by reference. Commercially available scleroglucan is sold under the trademarks "Polytran" from the Pillsbury Company and "Actigum CS-11" from CECA S.A. *Succinoglycan polysaccharides* are produced by cultivating a slime-forming species of Pesudomonas, Rhizobium, Alcaligenes or Agrobacterium, e.g., *Pseudomonas sp.* NCIB 11264, *Pseudomonas sp.* NCIB 11592 or Agrobacterium radiobacter NCIB 11883, or mutants thereof, as described in European Patent No. A40445 or A138255. Commercially available succinoglycan biopolymer is sold by Shell International Chemical Company of London, U.K., under the trademark "Shellflo-S".

The minimum concentration of the polymer required to increase the low shear rate viscosity of the fluid can be determined by routine testing. Thus the minimum concentration will be an amount sufficient to impart to the fluid the desired low shear rate viscosity. Generally the fluids will contain a concentration from about 0.7 kg/m3 (0.25 ppb) to about 11.4 kg/m3 (4 ppb), preferably from about 1.4 kg/m3 (0.5 ppb) to about 7.1 kg/m3 (2.5 ppb).

The water base borehole fluids of this invention generally may contain materials well known in the art to provide various characteristics or properties to the fluid. Thus the fluids may contain one or more viscosifiers or suspending agents in addition to the polysaccharide required, weighting agents, corrosion inhibitors, soluble salts, biocides, fungicides, seepage loss control additives, bridging agents, deflocculants, lubricity additives, shale control additives, and other additives as desired.

The borehole fluids may contain one or more materials which function as encapsulating or fluid loss control additives to further restrict the entry of liquid from the fluid to the contacted shale. Representative materials known in the art include partially solublized starch, gelatinized starch, starch derivatives, cellulose derivatives, humic acid salts (lignite salts), lignosulfonates, gums, synthetic water soluble polymers, and mixtures thereof The fluids of this invention should have a pH in the range from about 7.0 to about 11, preferably from 8 to about 10.5. The pH can be obtained as is well known in the art by the addition of bases to the fluid, such as potassium hydroxide, potassium carbonate, potassium humate, sodium hydroxide, sodium carbonate, sodium humate, magnesium oxide, calcium hydroxide, zinc oxide, and mixtures thereof. The preferred base is magnesium oxide.

The surfactants useful in the present invention to create the aphrons must be compatible with the polymers present in the fluid to create the desired low shear rate viscosity. Thus the surfactants will generally be non-ionic or anionic. A test procedure has been devised to determine if a surfactant can be used in the present invention to generate the aphrons. The procedure is as follows:

To a low temperature, low pressure API filtration cell (API Recommended Practice 13 B-1), the cylindrical body of which is made from Plexiglas of thickness 0.5 inch (1.3 centimeters), is added 200 grams of sand having a particle size in the range from 50 mesh to 70 mesh (297 $\mu$m to 210 $\mu$m). This provides a sand bed depth of 2.1 centimeters. No filter paper is used in the cell. 350 cc of the fluid to be tested is slowly added to the cell, the cell assembled, and 100 psi nitrogen pressure applied. The pressure is released after the nitrogen blows through the bed for 30 seconds. Upon releasing the pressure the sand bed will expand in volume/height as the bubbles in the sand bed expand. The expansion is not even, and an average increase in height of the bed as measured at the cell wall and at the center of the sand bed is obtained. Surfactants which increase the sand bed by at least 50% are considered to be preferred for the generation of aphrons in the present invention. Test Fluid: contains 1.5 pounds per 42 gallon barrel (4.285 kg/m3) of well hydrated xanthan gum in water and 1 pound per 42 gallon barrel (2.857 kg/m3) of surfactant to be tested. The surfactant is dispersed in the xanthan gum dispersion by spatulation to prevent the generation of a foam. Solid surfactants are first dissolved in an appropriate water dispersible or soluble solvent before adding them to the xanthan gum dispersion.

The book by Felix Sebba entitled "Foams and Biliquid Foams—Aphrons", John Wiley & Sons, 1987, incorporated herein by reference, is an excellent source on the preparation and properties of microbubbles.

An aphron is made up of a core which is often spherical of an internal phase, usually liquid or gas, encapsulated in a thin aqueous shell. This shell contains surfactant molecules so positioned that they produce an effective barrier against coalescence with adjacent aphrons.

The aphrons when first generated contain a wide size distribution ranging up to about 200 m in diameter. At atmospheric pressure, the aphrons of very small diameter diminish very rapidly leaving aphrons in the 25 m to about 200 m size range. This is due to the excess pressure within the aphrons which increases as the diameter of the aphrons decreases. Thus the smaller aphrons will tend to diminish in size by transferring their gas to the larger ones which would have a lower excess pressure.

In the case of the aphron-containing well drilling and servicing fluids of the present invention, the aphrons are generated downhole as the fluid exits the drilling bit. The fluid is under considerable pressure composed of hydrostatic as well as pressure loss created by the circulating system. It is believed that this fluid pressure compensates for the excess pressure within the aphrons such that the aphrons smaller than about 25 $\mu$m are stabilized for a period of time until they are circulated up the borehole. The aphrons thus are able to penetrate within the pore spaces of the exposed formation where they can expand, because of the lower pore pressure within the formation, and seal the pore spaces from the entry of any fluid. Microfractures and the like will be filled with aphrons which likewise expand within the formation to seal the microfractures.

Increases in vapor pressure due to pressure drops, temperature increases, and cavitation are common in downhole conditions. Certain solvents which may be present in the fluid may also affect vapor pressure to provide gasses needed to form aphrons.

Aphrons large enough to be seen without magnification can be visually observed in the fluid as it flows from the borehole into the surface holding tanks ("pits") before being recirculated. Generally the fluid flows across a screen to remove the drill cuttings. Screens as fine as 200 mesh (74 $\mu$m screen openings) can be used with the fluids of the present invention. Aphrons greater than the screen size will be removed from the fluid. If desired, the particle size of the aphrons in the fluid can be determined with various particle size analyzers which are commercially available. See for example the following articles: (1) "Microbubbles: Generation and Interaction with Colloid Particles", James B. Melville and Egon Matijevic, Chapter 14 in "Foams", R. J. Akers, editor, Academic Press, 1976; (2) "Separation of Organic Dyes from Wastewater by Using Colloidal Gas Aphrons", D. Roy, K. T. Valsaraj, and S. A. Kottai, Separation Science and Technology, 27(5), pp. 573–588 (1992). These articles are incorporated herein by reference.

Upon being recirculated down the drill string and through the bit additional aphrons are generated provided the concentration of the surfactant is sufficient. It is desirable to add additional surfactant to the fluid either continuously or intermittently until the desired quantity of aphrons is produced.

The quantity of aphrons desired in the fluid depends on the density reduction required. Thus the density of the circulating fluid can be monitored on the surface and additional surfactant added as necessary to maintain the desired density.

The concentration of surfactant required in any case is less than the critical micelle concentration (CMC) of the surfactant. Generally a concentration of surfactant from about 0.015% by volume to about 0.15% by volume, depending on the particular surfactant present in the fluid, is required, preferably from about 0.03% to about 0.1% by volume assuming the surfactant contains about 80% by weight solids.

If desired, the aphrons can be generated on the surface using the procedures and equipment set forth in the following U.S. Patents, incorporated herein by reference: Sebba Pat. No. 3,900,420 and Michelsen Pat. No. 5,314,644. The well drilling and servicing fluid containing the aphrons can then be continuously circulated in the borehole.

The so-called water soluble polymer present in the fluid to enhance the low shear rate viscosity of the fluid also helps to stabilize the aphrons, thus helping to prevent their coalescence.

It is preferred that the surfactant be added to the drilling and well servicing fluid under pressure by pumping the surfactant into the fluid.

If necessary, air or other gas can be injected into the fluid to entrain more gas for forming the aphrons as the fluid exits the drill bit at the bottom of the borehole.

The following examples are illustrative of this invention and are not to be regarded as limitative.

The Lost Circulation Preventative Fluid system (hereinafter sometimes referred to as "LCPF" System) is initially prepared containing 1.5–2.0 lbm/bbl (4.285–5.714 kg/m3) of xanthan gum biopolymer and 0.075% by volume of a blend of nonionic and anionic surfactants (80% concentration, by weight, in an aqueous solution). This surfactant blend exhibited an average % increase in the height of sand bed test of 55%. The biopolymer is hydrated in the fluid, and the surfactant is injected under pressure into the fluid in the standpipe. The LCPF system has been evaluated as indicated in the Examples.

The low shear rate viscosity was increased for hole cleaning and to create a resistance to movement into the formation, while the polymer encapsulation helped provide strength for the bubble wall surrounding the aphrons produced downhole as the LCPF system exited the drill bit. The surfactant solution enabled the aphrons to form, reducing the fluid density and providing "bubble bridging"to seal off the formations drilled.

EXAMPLE 1

BACKGROUND

A horizontal reentry well was planned in the Lodgepole formation in Billings County, North Dakota. The drilling fluid requirements were several. The fluid had to have carrying capacity to carry out milled cuttings as the window was cut. It also would need lubricity and stability in carrying out the drilling operations during the build and lateral section, and the ability to provide invasion control while drilling the Lodgepole producing zone.

Lost circulation prevention was, of course, a necessity since the bottom hole pressure was low and the formation was fractured. Because of the downhole tools, MWD and mud motors, no bridging materials could be used to control losses.

Another factor was the cold weather. Freezing temperatures required some salinity so that cut brine was used, and the resulting base fluid weighted over 9.3 ppg. The fluid then had to provide a measure of lost circulation prevention and invasion control due to this overbalance condition.

For these reasons, the well was planned using the LCPF system.

APPLICATION

The LCPF System was prepared and circulated in the borehole and drilling commenced. The milling, kickoff, and build operations were done with no problems. The zone was drilled with the LCPF system having a density of 8.7 ppg. This low density, along with the invasion control properties of the system allowed the operator to drill the zone successfully.

The lateral was drilled as planned with no losses and with excellent hole conditions.

EXAMPLE 2

BACKGROUND

A well was being drilled in the Sprayberry area of West Texas. Severe lost circulation was common while drilling in this area. It was necessary to carry 12 lbm-bbl (34.3 kg/m3) or more lost circulation material and bypass the solids removal equipment. Whenever lost circulation material content dropped, losses would recur.

Mud problems and poor hole conditions were common due to the buildup of solids and a decision was made to replace the existing system with the LCPF System.

APPLICATION

The LCPF System was prepared and circulated in the borehole to displace the fluid in the hole and to create aphrons in the fluid. The aphrons helped to reduce density from 9.2 to 8.2 ppg and formed a "Bubble Bridge" helping stop fluid movement into the loss zone. Solids removal was resumed and the well was drilled to total depth with no further losses. A subsequent well was being drilled in the area using the LCPF System with no loses and no mud problems.

EXAMPLE 3

BACKGROUND

Two re-entry wells were drilled in the North Texas area into the reef portion of the dolomitic zone. This formation was highly vugular with large, interconnected openings. Severe losses had been experienced in this zone.

A typical procedure was to drill into the zone, and if it was present, complete returns were lost. To regain circulation meant pumping away large volumes of drilling mud with high concentrations of bridging materials, as high as 35 lbm/bbl (100 kg/m3).

In this area, the problem was compounded by the presence of a gas cap above the reef zone requiring 9.0 ppg fluid to prevent gas entry.

After careful evaluation of the severe problems in this area a program was designed to provide success in drilling and evaluating these zones by using the LCPF System.

APPLICATION

The LCPF System was prepared and drilling commenced while surfactant was injected. When adequate aphrons were generated in the LCPF system, the system was weighted up with barite to 9.0 ppg and the zone was drilled without any lost circulation.

Logging and completion was easily accomplished and the wells were put on production with no cleanup or stimulation required.

EXAMPLE 4

BACKGROUND

A horizontal well was planned in the Sisquoc formation in Santa Barbara Co., California. Solutions to several problems were crucial to the success in drilling this well.

The Sisquoc is a multi-layered, water sensitive zone containing clays, shales, and sand. Drilling horizontally across it would require inhibition for shale stability, prevention of cuttings bed buildup in the lateral and build section, and the ability to maintain circulation through the low pressure, unconsolidated sands.

Use of conventional lost circulation material was prohibited since logging while drilling navigation tools would be required to accurately drill the zone. Invasion of the sensitive zone with solids and lost circulation material laden fluid was also discouraged.

For these reasons, the well was planned using the LCPF System.

APPLICATION

The multiple clay, shale, and sand zones were drilled with a low density LCPF System. This low density, along with the invasion control properties of the system allowed the operator to drill the zone successfully.

The intermediate was drilled through reactive clay beds and shales while building angle to a casing point of 92° where casing was set with no problems. Previous wells experienced severe problems drilling and running casing through this interval.

The lateral borehole was drilled past 800 feet (243.8 meters) with no losses and good hole conditions. A 6⅝ " slotted liner was run to bottom with no difficulty.

EXAMPLE 5

Surfactants were screened for use in the present invention using the test procedure set forth hereinbefore. The average percent increase in height of the sand bed is as follows:

| Surfactant | % Increase |
| --- | --- |
| Sodium dioctyl sulfosuccinate | 118.8 |
| Chubb National Foam-High Expansion | 96.4 |
| Alpha olefin sulfonate | 63.7 |
| Ethoxylated 2,4,7,9-tetramethyl-5-decyn-4,-diol | 56.0 |
| Linear C9–C11 alcohol ethoxylates, ave. 6 moles EO/mole | 56.0 |
| Tetrasodium N-(1,2-dicarboxyethyl)-N-octadecyl sulfosuccinate | 50.6 |
| Mixture of diethanolamides of fatty acids | 50.0 |
| Sodium disopropyl naphthalene sulfonate | 38.1 |
| Linear C12–C15 alcohol ethoxylates, ave. 7 moles EO/mole | 38.1 |
| Modified alkyl ether sulfate | 28.6 |
| Ethoxylated Octadecylamine-Octadecylguanidine complex | 19.0 |
| Ethoxylated (20 moles) methyl glucoside sesquistearate | 19.0 |
| 2,4,7,9-tetramethyl-5-decyne-4,7-diol | <10 |
| Ethoxylated (1 mole) nonyl phenol | <10 |
| Sodium alkyl sulfate | <10 |
| Polyoxypropylene-polyoxyethylene block copolymer | <10 |

What is claimed is:

1. In a process of drilling a well wherein a re-circulatable drilling fluid is circulated in a borehole, the drilling fluid comprising an aqueous liquid having dispersed therein a polymer which increases the low shear rate viscosity of the fluid to the extent that the thixotropic index of the fluid is at least about 10, a method of decreasing the density of the fluid, decreasing the invasion of the fluid into formations contacted by the fluid, or decreasing the lost circulation potential of the fluid, which comprises adding to the fluid a surfactant and thereafter generating aphrons in the fluid.

2. The process of claim 1 wherein the aphrons are generated by circulating the fluid down the drill pipe and through the openings in the bit whereby the aphrons are generated by the pressure drop as the fluid exits the drill bit and contacts the formation being drilled.

3. The process of claim 1 wherein a gas is mixed into the fluid.

4. The process of claim 1 wherein the surfactant provides an average percent expansion of a sand bed of at least about 50% when evaluated according to the following test procedure: to a low temperature, low pressure API filtration cell (API Recommended Practice 13 B-1), the cylindrical body of which is made from Plexiglas of thickness 0.5 inch (1.3 centimeters) is added 200 grams of sand having a particle size in the range from 50 mesh to 70 mesh (297 m to 210 $\mu$m); this provides a sand bed depth of 2.1 centimeters; no filter paper is used in the cell; 350 cc of the fluid to be tested is slowly added to the cell, the cell assembled, and 100 psi nitrogen pressure applied; the pressure is released after the nitrogen blows through the bed for 30 seconds; upon releasing the pressure the sand bed will expand in volume/height as the bubbles in the sand bed expand; the expansion is not even, and an average increase in height of the bed as measured at the cell wall and at the center of the sand bed is obtained; wherein the test fluid comprises 4.285 kg/m3 of well hydrated xanthan gum in water and 2.857 kg/m3 of the surfactant to be tested, wherein the surfactant is dispersed in the xanthan gum dispersion by very low shear mixing to prevent the formation of a foam.

5. The process of claim 1, 2, 3, or 4 wherein the surfactant is injected into the drilling fluid under pressure.

6. The process of claim 1, 2, 3, or 4 wherein the polymer is a biopolymer.

7. A well drilling and servicing fluid which can be continuously circulated in a borehole comprising an aqueous liquid, a polymer which increases the low shear rate viscosity of the fluid to the extent that the thixotropic index of the fluid is at least 10, a surfactant, and aphrons which are generated by the encapsulation of gas in the fluid by a thin aqueous surfactant-containing shell wherein the surfactant molecules are so positioned that they produce an effective barrier against coalescence with adjacent aphrons.

8. The well drilling and servicing fluid of claim 7 wherein the polymer is a biopolymer.

9. The well drilling and servicing fluid of claim 7 or 8 wherein the surfactant provides an average percent expansion of a sand bed of at least about 50% when evaluated according to the following test procedure: to a low temperature, low pressure API filtration cell (API Recommended Practice 13 B-1), the cylindrical body of which is made from Plexiglas of thickness 0.5 inch (1.3 centimeters) is added 200 grams of sand having a particle size in the range from 50 mesh to 70 mesh (297 $\mu$m to 210 $\mu$m); this provides a sand bed depth of 2.1 centimeters; no filter paper is used in the cell; 350 cc of the fluid to be tested is slowly added to the cell, the cell assembled, and 100 psi nitrogen pressure applied; the pressure is released after the nitrogen blows through the bed for 30 seconds; upon releasing the pressure the sand bed will expand in volume/height as the bubbles in the sand bed expand; the expansion is not even, and an average increase in height of the bed as measured at the cell wall and at the center of the sand bed is obtained; wherein the test fluid comprises 4.285 kg/m3 of well hydrated xanthan gum in water and 2.857 kg/m3 of the surfactant to be tested, wherein the surfactant is dispersed in the xanthan gum dispersion by very low shear mixing to prevent the formation of a foam.

10. In a method of drilling or servicing a well in a subterranean formation containing lost circulation zones or depleted, low pressure reservoirs wherein a well drilling or servicing fluid is circulated within the wellbore, a method of preventing the loss of circulation therein by using as the well drilling or servicing fluid the fluid of claims 7 or 8.

11. The method of preventing the loss of circulation of claim 10 wherein the surfactant provides an average percent expansion of a sand bed of at least about 50% when evaluated according to the following test procedure: to a low temperature, low pressure API filtration cell (API Recommended Practice 13 B-1), the cylindrical body of which is made from Plexiglas of thickness 0.5 inch (1.3 centimeters) is added 200 grams of sand having a particle size in the range from 50 mesh to 70 mesh (297 $\mu$m to 210 $\mu$m); this provides a sand bed depth of 2.1 centimeters; no filter paper is used in the cell; 350 cc of the fluid to be tested is slowly added to the cell, the cell assembled, and 100 psi nitrogen pressure applied; the pressure is released after the nitrogen blows through the bed for 30 seconds; upon releasing the pressure the sand bed will expand in volume/height as the bubbles in the sand bed expand; the expansion is not even, and an average increase in height of the bed as measured at the cell wall and at the center of the sand bed is obtained; wherein the test fluid comprises 4.285 kg/m3 of well hydrated xanthan gum in water and 2.857 kg/m3 of the surfactant to be tested, wherein the surfactant is dispersed in the xanthan gum dispersion by very low shear mixing to prevent the formation of a foam.

12. A process of drilling a well which comprises circulating within the borehole a drilling fluid comprising an aqueous liquid having dispersed therein a polymer which increases the low shear rate viscosity of the fluid to the extent that the thixotropic index of the fluid is at least about 10 and a surfactant, generating aphrons in the drilling fluid by encapsulating the air available in the drilling fluid, and thereafter re-circulating the aphron-containing drilling fluid within the borehole as drilling proceeds.

13. The process of claim 12 wherein the surfactant provides an average percent expansion of a sand bed of at least about 50% when evaluated according to the following test procedure: to a low temperature, low pressure API filtration cell (API Recommended Practice 13 B-1), the cylindrical body of which is made from Plexiglas of thickness 0.5 inch (1.3 centimeters) is added 200 grams of sand having a particle size in the range from 50 mesh to 70 mesh (297 $\mu$m to 210 $\mu$m); this provides a sand bed depth of 2.1 centimeters; no filter paper is used in the cell; 350 cc of the fluid to be tested is slowly added to the cell, the cell assembled, and 100 psi nitrogen pressure applied; the pressure is released after the nitrogen blows through the bed for 30 seconds; upon releasing the pressure the sand bed will expand in volume/height as the bubbles in the sand bed expand; the expansion is not even, and an average increase in height of the bed as measured at the cell wall and at the center of the sand bed is obtained; wherein the test fluid comprises 4.285 kg/m$^3$ of well hydrated xanthan gum in water and 2.857 kg/m$^3$ of the surfactant to be tested, wherein the surfactant is dispersed in the xanthan gum dispersion by very low shear mixing to prevent the formation of a foam.

14. The process of claim 12 or 13 wherein the surfactant is injected into the drilling fluid under pressure.

15. The process of claim 12 or 13 wherein the polymer is a biopolymer.

* * * * *